United States Patent
Byers

(10) Patent No.: US 9,067,149 B2
(45) Date of Patent: *Jun. 30, 2015

(54) ELECTRONIC SHIFT LOCKOUT FOR SCALE MODEL VEHICLE

(75) Inventor: Brent Whitfield Byers, Plano, TX (US)

(73) Assignee: TRAXXAS LP, McKinney, TX (US)

( * ) Notice: Subject to any disclaimer, the term of this patent is extended or adjusted under 35 U.S.C. 154(b) by 471 days.

This patent is subject to a terminal disclaimer.

(21) Appl. No.: 12/467,940

(22) Filed: May 18, 2009

(65) Prior Publication Data
US 2009/0240409 A1     Sep. 24, 2009

Related U.S. Application Data

(63) Continuation of application No. 10/424,446, filed on Apr. 28, 2003, now Pat. No. 7,559,822.

(51) Int. Cl.
| | |
|---|---|
| F16H 59/00 | (2006.01) |
| F16H 61/00 | (2006.01) |
| A63H 31/08 | (2006.01) |
| F16H 59/14 | (2006.01) |
| F16H 59/18 | (2006.01) |
| F16H 61/16 | (2006.01) |
| A63H 17/26 | (2006.01) |
| A63H 30/04 | (2006.01) |

(52) U.S. Cl.
CPC ............... *A63H 31/08* (2013.01); *Y10T 477/68* (2015.01); *Y10T 477/675* (2015.01); *Y10T 477/677* (2015.01); *Y10T 477/679* (2015.01); *Y10T 477/6935* (2015.01); *F16H 59/14* (2013.01); *F16H 59/18* (2013.01); *F16H 61/16* (2013.01); *F16H 2061/165* (2013.01); *A63H 17/26* (2013.01); *A63H 30/04* (2013.01)

(58) Field of Classification Search
USPC ......... 701/51, 62; 446/461, 462; 74/335, 377; 477/107, 110, 111, 115, 125
See application file for complete search history.

(56) References Cited

U.S. PATENT DOCUMENTS

| | | |
|---|---|---|
| 2,153,556 A | 4/1939 | Gartin |
| 2,999,397 A | 9/1961 | Walter |
| 3,071,021 A | 1/1963 | Miller |
| 3,340,972 A | 9/1967 | Burkland et al. |
| 3,422,693 A | 1/1969 | Vaiden |
| 3,479,895 A | 11/1969 | Wegener |
| 3,557,922 A | 1/1971 | Schwerdhoffer |
| 3,589,486 A | 6/1971 | Kelch |

(Continued)

OTHER PUBLICATIONS

Kyosho, "Exploded View—Mega Force Jr.", 2002, Kyosho Corporation, Japan.

(Continued)

*Primary Examiner* — Steven J Hylinski
(74) *Attorney, Agent, or Firm* — CARR Law Firm PLLC

(57) ABSTRACT

A powered scale model vehicle having a transmission with a forward gear and a reverse gear. The transmission is shiftable between the forward gear and the reverse gear. The vehicle has a radio control receiver, a sensor and a microcontroller. The receiver is adapted to output a throttle signal and a shift signal to the microcontroller. The sensor is adapted to obtain a vehicle speed measurement. The microcontroller is electrically coupled to the receiver and the sensor. The microcontroller may be adapted to control a timing and execution of a forward/reverse shift on the transmission based on at least the vehicle speed measurement, the throttle signal, and the shift signal, for example.

16 Claims, 4 Drawing Sheets

(56) References Cited

U.S. PATENT DOCUMENTS

| | | | |
|---|---|---|---|
| 3,805,640 A * | 4/1974 | Schneider et al. | 477/56 |
| 3,813,812 A | 6/1974 | Barlow et al. | |
| 3,965,612 A | 6/1976 | Asano | |
| 4,135,328 A | 1/1979 | Yamasaki | |
| 4,197,672 A | 4/1980 | Mabuchi et al. | |
| 4,329,886 A | 5/1982 | Branstner | |
| 4,475,618 A | 10/1984 | Kennedy et al. | |
| 4,485,587 A | 12/1984 | Barlow et al. | |
| 4,545,451 A | 10/1985 | Pipa et al. | |
| 4,577,528 A | 3/1986 | Hanzawa | |
| 4,648,853 A | 3/1987 | Siegfried | |
| 4,763,538 A | 8/1988 | Fujita et al. | |
| 4,878,877 A | 11/1989 | Auer et al. | |
| 4,924,720 A | 5/1990 | Shust | |
| 4,966,267 A | 10/1990 | Carlton | |
| 5,018,592 A * | 5/1991 | Buchdrucker | 180/19.3 |
| 5,096,034 A | 3/1992 | Foster | |
| 5,100,368 A | 3/1992 | Chien | |
| 5,233,525 A * | 8/1993 | Overmann et al. | 701/55 |
| 5,281,184 A | 1/1994 | Suimon | |
| 5,385,064 A | 1/1995 | Reece | |
| 5,492,024 A | 2/1996 | Siner | |
| 5,505,100 A * | 4/1996 | Mitchell et al. | 74/335 |
| 5,741,202 A * | 4/1998 | Huber | 477/124 |
| 5,762,532 A | 6/1998 | Ishizuka et al. | |
| 5,762,533 A | 6/1998 | Tilbor et al. | |
| 6,145,398 A * | 11/2000 | Bansbach et al. | 74/335 |
| 6,155,394 A | 12/2000 | Shook | |
| 6,367,345 B1 * | 4/2002 | Yeh | 74/377 |
| 6,505,527 B2 | 1/2003 | Lu | |
| 2003/0148703 A1 * | 8/2003 | Scott et al. | 446/456 |

OTHER PUBLICATIONS

Kyosho, "Instruction Manual—Field Baja Beetle", Kyosho Corporation, Japan.

Traxxas, "E-Maxx Transmission Assembly" exploded view, 2000, Traxxas LP, Plano, Texas.

\* cited by examiner

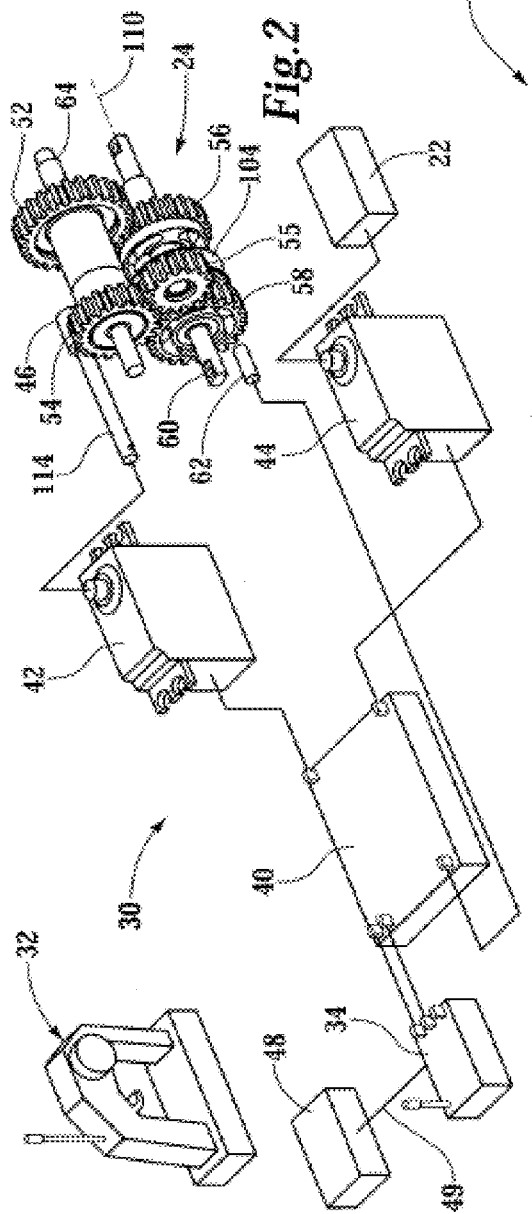

ELECTRONIC SHIFT LOCKOUT FOR SCALE MODEL VEHICLE

CROSS-REFERENCE TO RELATED APPLICATIONS

This application is a continuation of, and claims the benefit of the filing date of, co-pending U.S. patent application Ser. No. 10/424,446 entitled ELECTRONIC SHIFT LOCKOUT FOR SCALE MODEL VEHICLE, filed Apr. 28, 2003 now U.S. Pat. No. 7,559,822.

TECHNICAL FIELD

The present invention generally relates to remote-controlled and powered scale-model vehicles. In one aspect, the present invention relates to radio-controlled model racing vehicles powered by internal combustion engines and having a forward-reverse transmission.

BACKGROUND OF THE INVENTION

Radio-controlled scale model vehicle racing is a popular hobby sanctioned by Radio-Operated Auto Racing, Inc., among other rule making organizations. Competition events often feature model cars, model aircraft, and model boats. Racing heats are generally staged on a closed-circuit race course and require each competing model vehicle to complete as many laps as possible within a specified time period, with the model completing the largest number of laps being declared the winner. Some racing events are conducted over an unimproved off-road outdoor area where the model vehicle must be steered carefully to avoid collision with obstacles. When a collision occurs, it may be necessary to drive the model car in reverse to clear the obstacle before the race can be continued.

Each scale model vehicle is controlled in terms of steering, throttle and forward/reverse travel by low-power, digitally encoded radio-frequency command signals at a dedicated frequency generated by a hand-held remote control transmitter, for example. Each model is equipped with an onboard radio receiver that is tuned to the same frequency as the transmitter. The radio receiver provides control signals and power to servos that are actuated to cause the model to turn, increase speed, slow down, and reverse direction as commanded by the operator.

There are two main categories of radio-controlled scale model vehicles, battery-powered and fuel-powered. The prime mover in a battery-powered vehicle is an electric motor, while the prime mover in a fuel-powered vehicle is an internal combustion engine. Because fuel-powered vehicles typically do not have an onboard electrical generating system, a small battery is usually included to provide electrical power for operating onboard radio system components. The onboard radio system components typically include a receiver and servo motors. Conventional battery-powered vehicles typically achieve reversal of the prime mover (an electric motor) by reversing the polarity of the applied voltage. Most internal combustion engines are not reversible, and thus reversing the engine direction is typically not an option for providing reverse motion of the vehicle.

One conventional radio-controlled scale model vehicle is equipped with an onboard battery and a DC electric motor for cranking the internal combustion engine during starting, and also for providing motive power during reverse travel operation. The internal combustion engine in this case is not reversible, but provides operating power for the model vehicle during forward travel operation. The forward gear is disengaged and the engine is brought to idle under servo-control to permit transfer to the DC electric motor through a power transfer linkage and a reverse gear so that the model vehicle can be propelled by electrical power in the reverse direction using the starter motor.

It will be appreciated that the sequential shifting operation, which requires transition to idle speed, disengagement of the fuel engine and engagement of the electric drive motor, imposes an undesirable time delay before the vehicle motion can be completely reversed. Additionally, if the electric drive motor is engaged in a reverse direction while the vehicle is being operated at a high rate of speed, the gearing, and/or power transfer linkage may be damaged. Accordingly, there is a need for a simple, rapid, and reliable means for selectively reversing the forward driving torque produced by a prime mover, for example an internal combustion engine or inertial flywheel motor that is not reversible, into reverse driving torque, thus eliminating the need for an onboard battery and electric drive motor for reverse travel. Additionally, a shiftable transmission is needed for use in combination with a radio-controlled scale model vehicle in which shifting from forward to reverse is performed without damaging the transmission gear train or linkage.

A shift lockout means is desired for a transmission having a capability of shifting between forward and reverse to prevent damage to the drive train components, and to prevent loss of control and crashing that often occur if a shift is executed while the transmission is operating at high RPM.

Traxxas Corporation has provided a mechanical means of limiting the shifting from forward to reverse, which is disclosed in U.S. Pat. No. 6,367,345 ("the '345 patent"). An embodiment of this mechanical shift lockout system disclosed in the '345 patent includes an arrangement of mechanical components within the transmission designed to prevent shifting between forward and reverse directions when the vehicle's transmission is rotating above a certain rational speed (e.g., revolutions per minute—RPM). The mechanical shift lock system includes a one-way centrifugal lock-out clutch including springs to counter centrifugal forces caused by the rotation of a drive shaft within the transmission. However, it would be desirable to provide a more simplified system (mechanically) that may provide forward/reverse shifting performance comparable to or better than that of the mechanical shift lockout system disclosed in the '345 patent, while still using the primary motive force (i.e., the internal combustion engine used for forward motion) for providing reverse motion.

BRIEF SUMMARY OF THE INVENTION

The problems and needs outlined above are addressed by embodiments of the present invention. In accordance with one aspect of the present invention, an electronic shift lockout system for a powered scale model vehicle is provided. The system includes a radio control receiver, sensor, and microcontroller. The receiver is adapted to output a throttle signal and a shift signal. The sensor is adapted to provide a rotational speed signal corresponding to an actual rotational speed of at least a portion of a transmission for the vehicle. The microcontroller is electrically coupled to the receiver and the sensor. The microcontroller is adapted to control a timing and execution of a forward/reverse shift of the transmission based on the rotational speed signal, the throttle signal, and the shift signal.

The sensor may be positioned to measure a rotational speed of a transmission output shaft, a rotational speed of a vehicle wheel, a rotational speed of an engine output shaft, a rotational speed of a drive shaft, a rotational speed of a transmission input shaft, or a rotational speed of a transmission gear, for example. The system may further include a battery electrically coupled to the receiver. The receiver may act as a voltage regulator and a power distribution point to provide electrical power to the sensor and the microcontroller, for example.

In accordance with another aspect of the present invention, a powered scale model vehicle is provided. The powered scale model vehicle includes a transmission, a radio control receiver, a sensor, and a microcontroller. The transmission has a forward gear and a reverse gear, and the transmission is shiftable between the forward gear and the reverse gear. The receiver is adapted to output a shift signal and/or a throttle signal. The sensor is adapted to obtain a vehicle speed measurement. The microcontroller is electrically coupled to the receiver and the sensor. The microcontroller is adapted to control a timing and execution of a forward/reverse shift on the transmission based on the vehicle speed measurement, the throttle signal, the shift signal, or any combination thereof. The vehicle preferably includes an electric motor that is electrically coupled to the microcontroller. The electric motor is preferably controlled by the microcontroller, and the electric motor has an output shaft mechanically coupled to a shift lever on the transmission so that the electric motor is adapted to actuate the shift lever.

In accordance with yet another aspect of the present invention, a powered scale model vehicle is provided. The vehicle includes a transmission, a radio control receiver, and a microcontroller. The transmission has a forward gear and a reverse gear, wherein the transmission is shiftable between the forward gear and the reverse gear. The receiver is adapted to output a throttle signal and a shift signal. The microcontroller is electrically coupled to the receiver. The microcontroller is adapted to control a timing and execution of a forward/reverse shift on the transmission based on at least the throttle signal and the shift signal.

In accordance with still another aspect of the present invention, a powered scale model vehicle is provided. The vehicle includes a transmission, an electric motor, a radio control receiver, a sensor, and a microcontroller. The transmission has a forward gear for providing forward motion of the vehicle and a reverse gear for providing reverse motion of the vehicle, wherein the transmission may be shifted between the forward gear and the reverse gear using a shift lever. The electric motor has an output shaft mechanically coupled to the shift lever so that the electric motor is adapted to actuate the shift lever.

The receiver is adapted to output a throttle signal and a shift signal. The sensor is adapted to provide a rotational speed signal corresponding to an actual rotational speed of at least a portion of the transmission. The microcontroller is electrically coupled to the receiver, the sensor, and the electric motor. The microcontroller is adapted to control the timing and execution of a forward/reverse shift via the electric motor based on the rotational speed signal, the throttle signal, and the shift signal.

In accordance with another aspect of the present invention, a method of shifting between a forward gear and a reverse gear on a transmission of a powered scale model vehicle is provided. The method includes the following actions and decisions, the order of which may vary. A vehicle operator's command for a forward/reverse shift is received. It is determined whether a vehicle speed measurement from a sensor is less than a threshold speed value. If the vehicle speed measurement is not less than the threshold speed value, a throttle output signal is made the same as a throttle input signal, the forward/reverse shift is prevented from being initiated, and the determining whether the vehicle speed measurement is less than the threshold speed value is repeated. If the vehicle speed measurement is less than the threshold speed value, it is determined whether the throttle input signal is greater than a threshold throttle value. If the throttle input signal is greater than the threshold throttle value, the throttle output signal is made the same as the throttle input signal, the forward/reverse shift is prevented from being initiated, the determining whether the vehicle speed measurement is less than the threshold speed value is repeated (optionally), and the determining whether the throttle input signal is greater than the threshold throttle value is repeated.

If the throttle input signal is not greater than the threshold throttle value, a throttle delay timer is started, the forward/reverse gear shift is initiated, and the throttle output signal is kept at or below the threshold throttle value regardless of the throttle input signal while the throttle delay timer is running. It is next determined whether a delay time has elapsed on the throttle delay timer. If the delay time has not elapsed, the performing of the forward/reverse gear shift is continued (if not complete) and the throttle output signal is kept at or below the threshold throttle value regardless of the throttle input signal while the throttle delay timer is running. If the delay time has elapsed on the throttle delay timer, the throttle output signal is made the same as the throttle input signal.

BRIEF DESCRIPTION OF THE DRAWINGS

The above features of the present invention will be more clearly understood from consideration of the following descriptions in connection with accompanying drawings in which:

FIG. 2 is schematic of a system of electrical and mechanical components, which are used in an embodiment of the present invention;

FIG. 5 is a logic truth table for a preferred embodiment of the present invention.

DETAILED DESCRIPTION OF THE PREFERRED EMBODIMENTS

Figure 1:
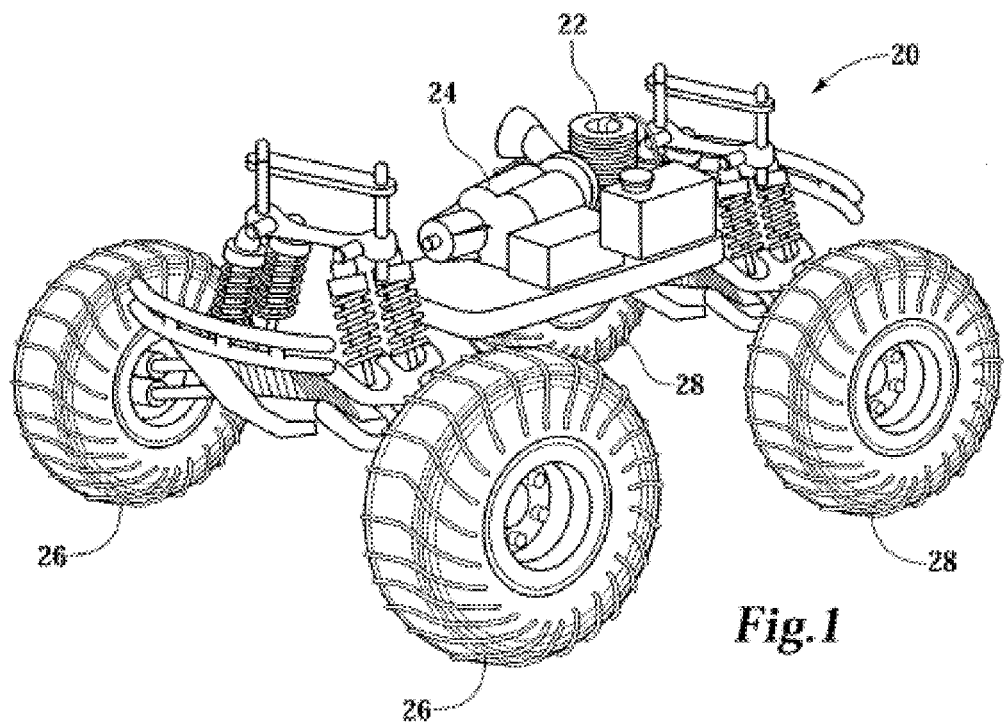
FIG. 1 is perspective view of a radio-controlled fuel-powered 4.times.4 truck (shown without its body for purposes of illustration) incorporating a preferred embodiment of the present invention.

Referring now to the drawings, wherein like reference numbers are used herein to designate like elements throughout the various views, a preferred embodiment of the present invention is illustrated and described. As will be understood by one of ordinary skill in the art, the figures are not necessarily drawn to scale, and in some instances the drawings have been exaggerated and/or simplified in places for illustrative purposes only. One of ordinary skill in the art will appreciate the many applications and variations of the present invention in light of the following description of a preferred embodiment of the present invention. The preferred embodiment discussed herein is an illustrative example of the present invention and does not limit the scope of the invention to the preferred embodiment shown.

This section will describe a preferred embodiment of the present invention and its advantages. FIG. 1 is a perspective view of a fuel-powered radio-controlled vehicle 20 that incorporates an embodiment of the present invention. Hence, for purposes of discussion, an embodiment of the present invention will be described in the context of the vehicle 20 shown in FIG. 1. The vehicle 20 has a fuel-powered internal combustion engine 22, which is not reversible in this case. However, in other embodiments, a reversible internal combustion engine may be used. The vehicle 20 has a two-speed two-direction transmission 24 mechanically coupled to the output shaft (not shown) of the engine 22. The output shaft of the transmission 24 is mechanically coupled to two drive shafts (not shown), as this vehicle 20 has four-wheel drive.

A front drive shaft feeds into a front differential (not shown), which translates torque to the front wheels 26. Similarly, a rear drive shaft feeds into a rear differential (not shown) to translate torque to the rear wheels 28. In other embodiments, however, the vehicle may be one-wheel drive or two-wheel drive, for example. Further details regarding the transmission 24 are described below. Although the vehicle 20 shown in FIG. 1 is adapted for off-road use, other embodiments may be incorporated into other types of vehicles, such as street vehicles, for example.

FIG. 2 is a schematic showing some of the electrical and mechanical components of the embodiment for the vehicle 20 of FIG. 1. FIG. 2 shows how electrical and mechanical components of the system 30 interact. An operator/driver (not shown) of the vehicle 20 may control the vehicle 20 using buttons, levers, and/or knobs on a transmitter 32. The transmitter 32 sends radio signals to a receiver 34 corresponding to control inputs by the operator. Such transmitters 32 and receivers 34 are well known and their designs and transmission methods may vary. The receiver 34 is electrically coupled to a microcontroller 40, and the microcontroller 40 is electrically coupled to servos 42, 44.

In a conventional radio-controlled vehicle system, the receiver 34 is typically electrically coupled directly to the servos 42, 44. But in the embodiment of FIG. 2, the microcontroller 40 is connected between receiver 34 and the servos 42, 44 because the microcontroller 40 may override or alter a signal from the receiver 34 before it is sent to the servos 42, 44. Hence, the microcontroller 40 may be programmed to control the timing and execution of a forward/reverse shift using logic, as discussed further below.

The servos 42, 44 are mechanically coupled to mechanical components to provide mechanical actuation of their respective mechanical components. In the embodiment of FIG. 2, for example, a shift servo 42 is mechanically coupled to a shift fork 46 of the transmission 24. Part of the transmission 24 is shown (without its casing) in FIG. 2. A throttle servo 44 is mechanically coupled to a throttle valve (not shown) on the engine 22. Hence, when the shift servo 42 is actuated, it moves the shift fork 46 of the transmission, and when the throttle servo 44 is actuated, it moves the throttle valve on the engine 22.

Figure 3:
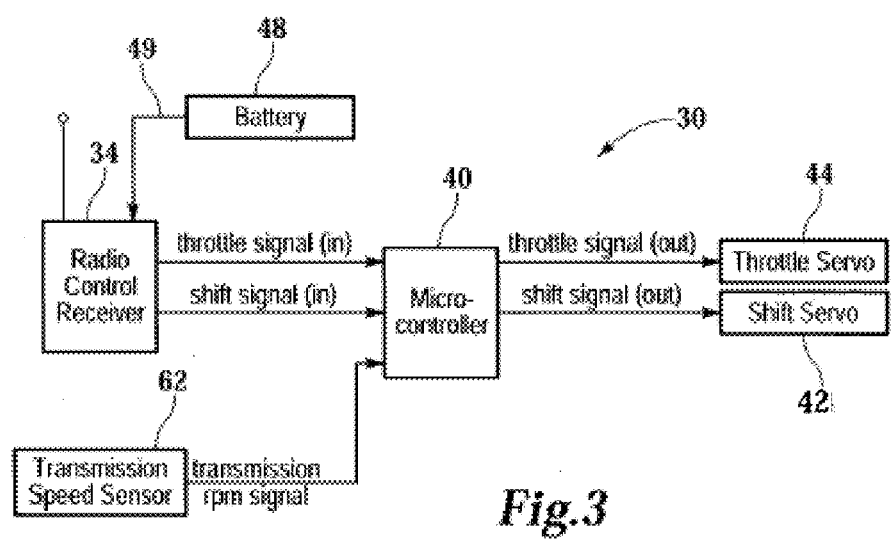
FIG. 3 is a simplified schematic of electrical components from the vehicle of FIG. 1, which are used in an embodiment of the present invention.

FIG. 3 is an electrical schematic for the electrical components of the system 30 in FIG. 2, which are on the vehicle 20. In this embodiment, a battery 48 is electrically coupled to the receiver 34. The receiver 34 in this case incorporates a voltage regulator (not shown) outputting about 5V (regulated), for example. Hence, the receiver 34 is used as the power source for the other electrical components of FIG. 3. Except for the battery connection 49 to the receiver 34, the power connections for the other electrical components of FIG. 3 are not shown (for simplifying FIG. 3). Instead, the communication connections for measurement and control signals between the electrical components in FIG. 3 are shown.

When the receiver 34 obtains a throttle signal and/or a shift signal from the operator's transmitter 32 (shown in FIG. 2), they are forwarded to the microcontroller 40. The signals from the receiver 34 may be in the form of pulse-width modulated (PWM) signals, for example, as is common for radio-controlled vehicles. Preferably the microcontroller 40 is capable of accepting a standard PWM signal from a conventional receiver 34. However, because many different microcontrollers may be incorporated into an embodiment, a microcontroller may require conditioning of the signal from the receiver before it is input to the microcontroller.

The throttle signal (noted as "throttle signal (in)" in FIG. 3) from the receiver 34 corresponds to the throttle position desired by the operator for the engine 22. The shift signal (noted as "shift signal (in)" in FIG. 3) from the receiver 34 corresponds to the operator's choice of direction for propelling the vehicle 20 with the engine power (i.e., forward or reverse in this example). In a conventional system, the throttle signal would typically go directly to the throttle servo 44, without intervention by a microcontroller.

One of the goals of this embodiment is to prevent the transmission 24 from being shifted from forward to reverse (or vice versa) while the transmission gears are moving above a certain RPM to prevent damage to the transmission components or the inability for the transmission 24 to complete the shift. For the transmission 24 in this embodiment, it is ideal that the transmission gears are not rotating or are moving slowly during the execution of a forward/reverse shift. However, an inexperienced operator or a child operator may not realize this. Hence, to make the operation of the vehicle 20 more user friendly, it is desirable to control the timing of the shifting action to prevent damage to the vehicle 20 and to compensate for a driver's inexperience level. It is also desirable to make the shifting operation easier and quicker, even for experienced racers needing a quick forward/reverse shift. In the preferred embodiment, these goals are accomplished by enabling the shifting operation automatically (after the operator requests the shift action at the transmitter 32) as soon as the system 30 detects that the vehicle conditions needed for making a clean shift occur.

As noted above, one of the vehicle conditions relevant to allowing a clean shift for this transmission 24 is the rotational speed of the transmission gears 52, 54, 55, 56, 58. Because the transmission output shaft 60 (see FIG. 2) is mechanically coupled to the vehicle wheels 26, 28, the transmission output shaft 60 rotates when the vehicle wheels 26, 28 are rotating (and vice versa). The embodiment of FIG. 2 and FIG. 3 includes a transmission speed sensor 62 to detect the rotational speed of the transmission output shaft 60. The transmission gears 52, 54, 55, 56, 58 shown in FIG. 2 will be discussed in more detail below. Preferably, the transmission RPM signal output from the transmission sensor 62 is in a PWM form similar to the signals from the receiver 34. However, in other embodiments, the signal from the transmission sensor 62 may differ and may need conversion (e.g., A/D conversion) and/or conditioning before being fed into the microcontroller 40.

Also, in other embodiments the transmission output shaft RPM may be derived from or estimated based on a measurement of the rotational speed of one or more of the vehicle's wheels 26, 28. Hence, a wheel speed sensor (not shown) may be used instead of or in addition to a transmission speed sensor 62 for other embodiments. However, due to the differential gears, the rotational speed of a single wheel may not indicate the actual rotational speed of the transmission output shaft 60, as other wheels may be spinning at different rates. Thus, the use of a sensor 62 at the transmission 24 is preferred.

Another relevant vehicle condition for allowing a clean shift for this embodiment is the threshold throttle position. The threshold throttle position is used to ensure that minimum load (torque) is being applied to the transmission during the shifting action. Although the throttle position may reflect engine RPM, it more accurately reflects the torque (load) that is being output by the engine and applied to the transmission. Thus the shifting action is contingent on the appropriate vehicle (transmission) RPM and transmission load. The output shaft of the engine 22 is mechanically coupled to the transmission input shaft 64 (see FIG. 2). For the transmission design of this embodiment, it is preferred that the transmission input shaft 64 and the transmission output shaft 60 are not moving or only moving below a predetermined threshold RPM to provide a clean, reliable shift and to prevent damage to the transmission components.

The microcontroller 40 receives the signal inputs for the throttle signal, the shift signal, and the transmission rpm signal, and uses these inputs to determine whether the vehicle conditions are satisfactory to initiate a forward/reverse shift in accordance with logic programmed into the microcontroller 40. After processing the input signals according to the programmed logic, the microcontroller 40 outputs a shift signal and a throttle signal, as shown in FIG. 3, to the respective servos 42 and 44. Hence, the microcontroller 40 controls the throttle signal (out) and shift signal (out) sent to the throttle servo 44 and the shift servo 42, respectively, based upon the vehicle conditions and the input signals.

Figure 4:
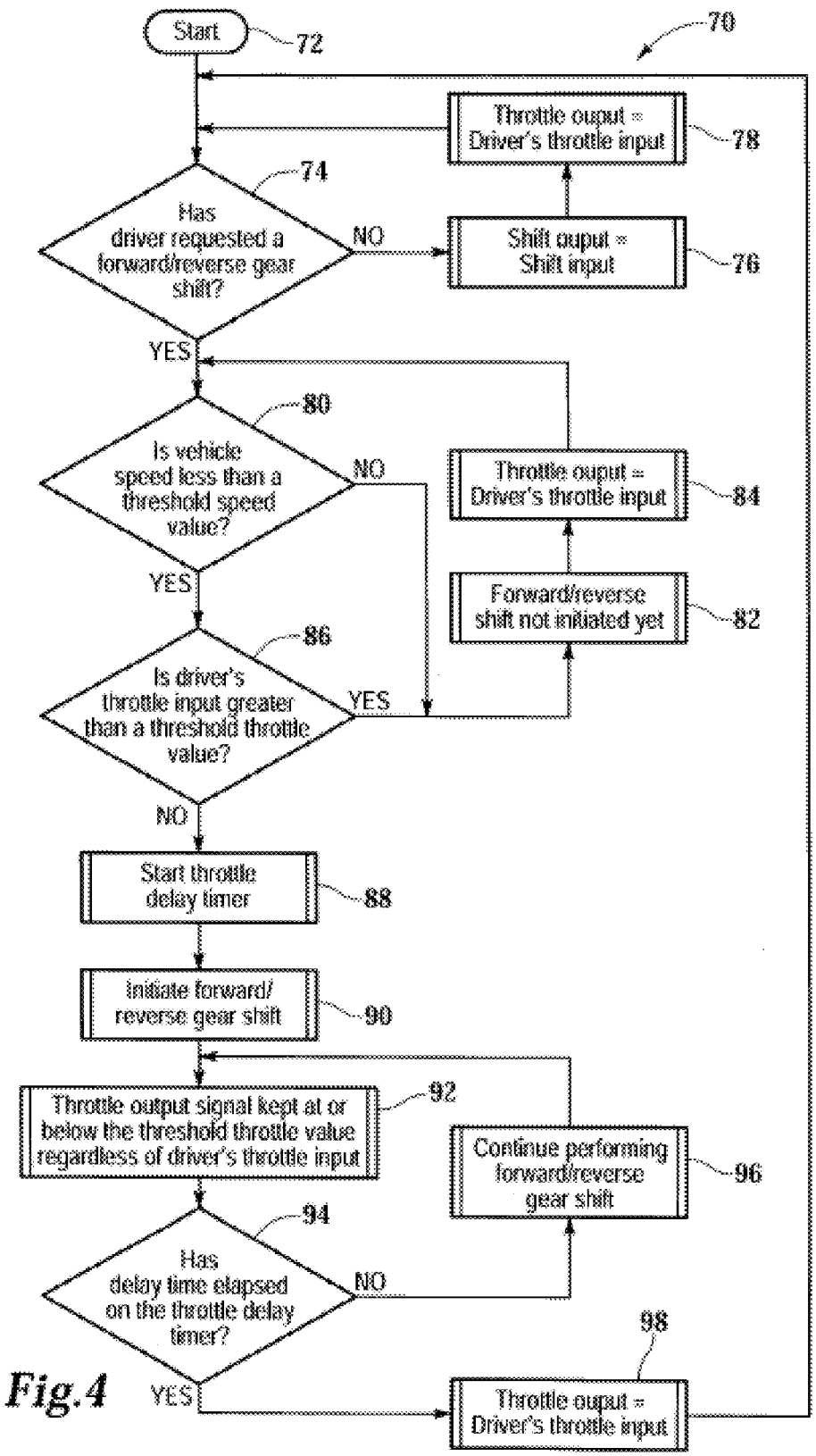
FIG. 4 is a flowchart illustrating a preferred logic sequence for an embodiment of the present invention.

FIG. 4 illustrates a preferred logic 70 for an embodiment, which may be programmed into the microcontroller 40. This logic 70 is preferably followed while the vehicle 20 is being operated. Beginning at the start block 72, it is first determined whether the driver/operator has requested a forward/reverse gear shift (see decision block 74). If the driver has not requested a forward/reverse gear shift, then the shift signal output from the microcontroller 40 is the same as the shift signal input (i.e., no shift requested) (see block 76) and the throttle output signal from the microcontroller 40 is the same as the throttle input signal from the receiver (see block 78). Hence, in this situation, the logic 70 loops until the driver makes a forward/reverse shift request, and the throttle and shift signals from the receiver 34 are unaltered by the microcontroller 40. Thus, the logic 70 shown in FIG. 4 becomes relevant when the operator requests a forward/reverse shift.

When the driver makes a forward/reverse shift request, it is next determined whether the vehicle speed (e.g., the transmission rotational speed at the transmission output shaft 60) is less than a threshold speed value (see decision block 80), which may be determined from the transmission RPM signal input to the microcontroller 40 (see FIG. 2 and FIG. 3). If the vehicle speed is not less than a threshold value, then the forward/reverse shift is not initiated yet (i.e., shift signal output from microcontroller 40 corresponds to a no-shift signal) (see block 82) and the throttle output signal from the microcontroller 40 is the same as the throttle input signal from the receiver 34 (see block 84). Hence, in this situation, the throttle signal from the receiver 34 is unaltered and the operator may continue to operate the vehicle in the current direction. At this point, the logic 70 continues looping until the vehicle speed is less than the threshold speed value (e.g., when the driver brings the vehicle 20 to a stop or a slow roll).

When the vehicle speed is less than a threshold speed value, it is next determined whether the driver's throttle input is greater than a threshold throttle value (see decision block 86). If the throttle input signal is greater than a threshold throttle value, then the forward/reverse shift is not initiated yet (see block 82) and the throttle output signal equals the throttle input signal (see block 84). In this situation, the logic 70 loops back to block 80. In alternative, the logic may loop back to block 86 at this point. Also, in another embodiment, block 80 may be switched with block 86 in their sequence, or the checks for blocks 80 and 86 may be performed in parallel. In an alternative embodiment, block 86 may be substituted for a decision block (not shown) to determine whether the rotational speed of the engine output shaft and/or the rotational speed of the transmission input shaft is below a threshold RPM based on a sensor reading, for example.

When the driver's throttle input is equal to or less than the threshold throttle value (i.e., the engine 22 is idling or the transmission is rotating at a sufficiently low RPM for a clean shift), a throttle delay timer is started (see block 88). Preferably, the throttle delay timer is incorporated into the microcontroller 40 using the microcontroller's clock. However, in other embodiments, an external delay timer may be used. Also at this point, the forward/reverse gear shift is initiated (see block 90). In other words, the shift output signal provided by the microcontroller 40 to the shift servo 42 causes the shift servo 42 to be actuated in the appropriate direction (e.g., forward to reverse position, or reverse to forward position). Furthermore, at this point when the shift is initiated, it is desired to prevent the driver from revving the engine 22 while the shift is being executed by the shift servo 42. Hence, the throttle output signal from the microcontroller 40 to the throttle servo 44 is kept at or below the threshold throttle value by the microcontroller 40, regardless of the driver's throttle input during the delay time (see block 92).

It is next determined whether the delay time on the throttle delay timer has elapsed (see decision block 94). If the delay time has not yet elapsed, the logic 70 continues looping while the shift servo 42 continues to perform the forward/reverse gear shift (see block 96) and the throttle output signal is kept below the threshold throttle value by the microcontroller 40 (see block 92). Preferably, the delay time for the throttle delay timer closely coincides with the amount of time that it takes for the shift servo 42 to complete its movement. For example, a typical shift servo may take less than about 0.15 seconds to complete a shift movement, and hence the delay time would preferably be approximately 0.15 seconds.

In other embodiments, a quicker or slower shift servo 42 may be used, and hence the delay time may vary accordingly in the programmed logic. Note that the order of blocks 88, 90, and 92 may be switched or altered in their sequence, and/or any of blocks 88, 90, and 92 may be performed simultaneously (in parallel). Therefore, if a driver requests full throttle while the shift is being performed (i.e., while the throttle delay timer is running), the throttle servo 44 will not be actuated according to the driver's request.

When the delay time on the throttle delay timer elapses, the throttle output signal from the microcontroller 40 is again made the same as the driver's throttle input (see block 98). If the driver is holding the throttle lever at full throttle, for example, when the delay time elapses, the throttle output signal will then immediate jump to a full throttle signal. Next the logic 70 returns again to the start 72 of the logic sequence awaiting the next forward/reverse shift request from the operator.

FIG. 5 is a logic truth table 100 representing an example embodiment of the logic 70 shown in FIG. 4. In this example of FIG. 5, the threshold speed value is 10 rpm, the threshold throttle value is 3% amplitude on the PWM signal, and the delay time is set to 0.15 seconds for the throttle delay timer. The shift signal is low for one direction (e.g., forward position for shift servo 42) and high for another direction (e.g., reverse position for shift servo 42). One of ordinary skill in the art should realize how the logic 70 of FIG. 4 and the truth table 100 of FIG. 5 may be programmed into a given microcontroller 40.

The microcontroller 40 may be a digital microprocessor running software code, a digital microprocessor having code hard encoded therein (temporarily or permanently), a combination of separate digital components, a combination of analog and digital components, a combination of separate analog components, or any combination thereof, for example. Preferably, the microcontroller 40 is an off-the-shelf product adapted for use in an embodiment through programming of the microcontroller 40. However, a custom dedicated circuit may also be used for the microcontroller 40. With the benefit of this disclosure, one of ordinary skill in the art should realize many possible alternatives for providing a microcontroller 40 for an embodiment.

Figure 6:
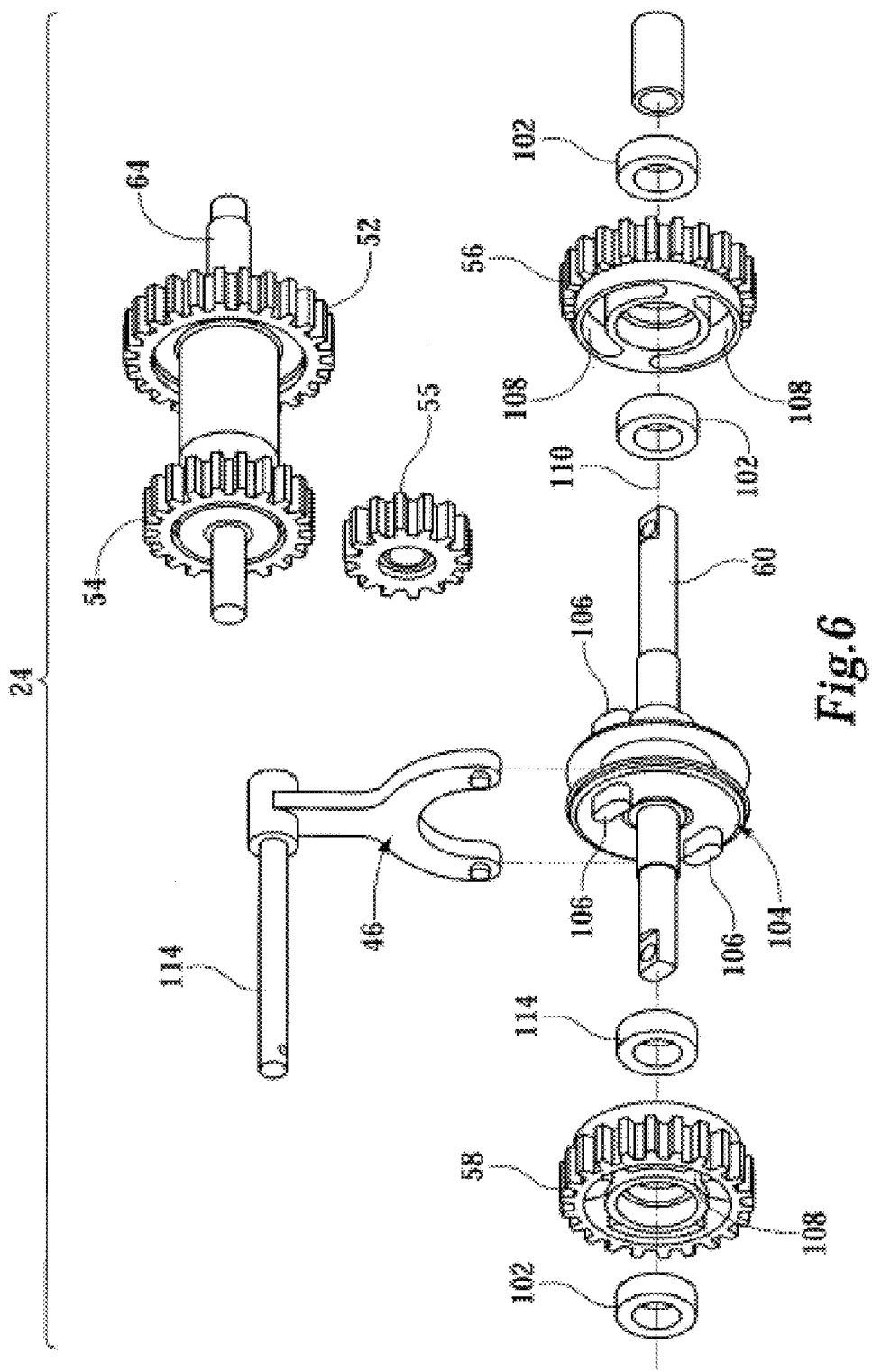
FIG. 6 is an exploded view of the mechanical transmission components of FIG. 2.

FIG. 6 is an exploded view of the transmission components shown in FIG. 2. Note that not all of the transmission components needed in an operable transmission 24 are shown in FIGS. 2 and 6, for purposes of simplification. In FIG. 6, the transmission input shaft 64 is mechanically coupled to the engine output shaft (not shown) (e.g., via a clutch mechanism) to receive torque and power from the engine 22. The inputs shaft 64 has a primary forward gear 52 and a primary reverse gear 54, both of which are fixed to the input shaft 64. The primary reverse gear 54 is smaller than the primary forward gear 52 because it is adapted to engage an idler gear 55, which reverses the rotational direction translated from the input shaft 64 to the output shaft 60 relative to the direction translated by the primary forward gear 52. Note that the positions of the forward gears 52, 56 and the positions of the reverse gears 54, 55, 58 may be switched in other embodiments.

Still referring to FIG. 6, the transmission output shaft 60 is parallel with the input shaft 64. The output shaft 60 is mechanically coupled to the vehicle wheels 26, 28 (e.g., via other transmission gears, drive shafts, and/or differentials). A forward output gear 56 and a reverse output gear 58 are both rotatably coupled to the output shaft 60 via bearings 102. Hence, either or both of the output gears 56, 58 may rotate relative to the output shaft 60. The forward output gear 56 is always directly engaged with and spins in response to rotation of the primary forward gear 52. Similarly, the reverse output gear 58 is always engaged with the primary reverse gear 54 (via the idler gear 55) and spins in response to rotation of the primary reverse gear 54.

The output shaft 60 has a dog slider 104 with integral drive dogs 106 extending therefrom. The drive dogs 106 extend from two sides of the dog slider 104. Each of the output gears 56, 58 has slots 108 formed therein, which are adapted to receive the drive dogs 106. The dog slider 104 may be fixed relative to the output shaft 60 (integrally, permanently, or removably). In such case, the output shaft 60 is permitted to slide along its rotational axis 110 along with the dog slider 104 when the dog slider 104 is moved. In alternative, the dog slider 104 may rotationally engage the output shaft 60 while being able to slide along the output shaft 60 along its rotational axis 110. In either case, the dog slider's movement along the rotational axis 110 of the output shaft 60 is driven by a shift fork 46. The shift fork 46 is fixed to a shift shaft 114. The shift shaft 114 is mechanically coupled to the shift servo 42 (e.g., using a lever, slider, and spring assembly). Hence, the shift servo 42 actuates the movement of the dog slider 104 via the shift shaft 114 and the shift fork 46.

When the shift fork 46 pushes the dog slider 104 along the rotational axis 110 toward the forward output gear 56, the drive dogs 106 facing the forward output gear 56 eventually engage the slots 108 formed in the forward output gear 56. With the forward output gear 56 engaged with the drive dogs 106, the input shaft 64 drives the output shaft 60 via the forward gears 52, 56 causing forward movement of the vehicle 20 (via the drive train and wheels 26, 28). In this configuration, the reverse output gear 58 is free to spin relative to the output shaft 60 because the drive dogs 106 are not engaged with the reverse output gear 58.

To perform a gear shift from forward to reverse, the shift servo 42 actuates the shift fork 46 toward the reverse output gear 58 (after being commanded to do so by the microcontroller 40 using the logic 70 of FIGS. 4 and 5). The shift fork 46 pulls the dog slider 104 toward the reverse output gear 58, and the drive dogs 106 disengage from the slots 108 of the forward output gear 56. As the dog slider 104 moves toward the reverse output gear 58, the drive dogs 106 facing the reverse output gear 58 engage with the slots 108 of the reverse output gear 58. With the reverse output gear 58 engaged with the drive dogs 106, the input shaft 64 drives the output shaft 60 via the reverse gears 54, 55, 58 causing reverse movement of the vehicle 20. In this configuration, the forward output gear 56 is free to spin relative to the output shaft 60 because the drive dogs 106 are not engaged with the forward output gear 56. To perform a gear shift from reverse to forward, the shift servo 42 actuates the shift fork 46 back toward the forward output gear 56 (as described above).

The components for the transmission 24 may be made from any of a variety of suitable materials, including (but not limited to): metal, nylon, thermoplastic, composites, or any combination thereof, for example. In the preferred embodiment, the gears 52, 54, 55, 56, 58 are made from injection molded nylon and the shafts 60, 64 are made from steel, for example. As will be apparent to one of ordinary skill in the art with the benefit of this disclosure, the gear configuration, materials, and design features of the transmission portion of the system 30 may vary for other embodiments.

An embodiment of the electronic shift lockout system 30 of the present invention may provide numerous advantages over a mechanical lockout system, including for example (but not necessarily limited to):

1. reduced manufacturing cost;
2. simplified mechanical design of the transmission;
3. fewer moving parts for the system to improve reliability;
4. improved shifting performance (e.g., quicker shifts, more reliable shifts, more accurate shift timing); and
5. improved vehicle acceleration, due to reduced vehicle weight and/or less drive train friction losses.

The present invention may be applicable to other fields beyond radio-controlled model four-wheel vehicles, including (but not necessarily limited to): radio-controlled model planes, radio-controlled model motorcycles, radio-controlled model tricycles, radio-controlled model boats, radio-controlled model submarines, radio-controlled toys, radio-controlled combat robots, and radio-controlled utility robots, for example.

Although the invention has been described with reference to certain exemplary arrangements, it is to be understood that the form of the invention shown and described is to be treated as a preferred embodiment. In light of the description herein, various changes, substitutions, and modifications may be realized without departing from the spirit and scope of the invention defined by the following claims.

I claim:

1. An electronic shift lockout system for a powered scale model vehicle, comprising:
   a radio control receiver, the receiver being adapted to receive a radio signal and output a throttle input signal and a shift signal;
   a sensor adapted to provide a rotational speed signal corresponding to an actual rotational speed of at least a portion of a transmission for the vehicle; and
   a microcontroller electrically coupled to the receiver and the sensor, the microcontroller being adapted to control a forward/reverse shift of the transmission based on the rotational speed signal, the throttle input signal, and the shift signal;
   wherein the microcontroller comprises a logic program, the logic program instructing the microcontroller to perform instructions comprising:
   determining whether the rotational speed signal from the sensor is less than a threshold speed value;
   if the rotational speed signal is not less than the threshold speed value, making a throttle output signal the same as the throttle input signal, preventing the forward/reverse shift from being initiated, and repeating the step of determining whether the rotational speed signal is less than the threshold speed value;
   if the rotational speed signal is less than the threshold speed value, determining whether the throttle input signal is greater than a threshold throttle value;
   if the throttle input signal is greater than the threshold throttle value, making the throttle output signal the same as the throttle input signal, preventing the forward/reverse shift from being initiated, and repeating the step of determining whether the rotational speed signal is less than the threshold speed value, and repeating the step of determining whether the throttle input signal is greater than the threshold throttle value;
   if the throttle input signal is not greater than the threshold throttle value, initiating the forward/reverse gear shift of the transmission.

2. A method of shifting between a forward gear and a reverse gear on a transmission of a powered scale model vehicle, the method comprising:
   receiving from a vehicle operator an electronic request for a forward/reverse shift;
   determining whether a vehicle speed measurement from an electronic sensor is less than a threshold speed value;
   if the vehicle speed measurement is not less than the threshold speed value, making an electronic throttle output signal the same as an electronic throttle input signal, preventing the forward/reverse shift from being initiated, and repeating the step of determining whether the vehicle speed measurement is less than the threshold speed value;
   if the vehicle speed measurement is less than the threshold speed value, determining whether the throttle input signal is greater than a threshold throttle value;
   if the throttle input signal is greater than the threshold throttle value, making the throttle output signal the same as the throttle input signal, preventing the forward/reverse shift from being initiated, repeating the step of determining whether the vehicle speed measurement is less than the threshold speed value, and repeating the step of determining whether the throttle input signal is greater than the threshold throttle value; and
   if the throttle input signal is not greater than the threshold throttle value, initiating the requested forward/reverse gear shift.

3. An electronic shift lockout system for a powered scale model vehicle, comprising:
   a transmission shifting assembly comprising:
      a shaft;
      a forward gear mounted on the shaft for rotation in a first direction;
      a reverse gear mounted on the shaft for rotation in a second direction;
      a coupling member mounted on the shaft for rotation with the shaft and for movement in the direction of the longitudinal axis of the shaft between a first position engaging the forward gear and a second position engaging the reverse gear;
      at least one forward gear drive post extending at least partially between the coupling member and the forward gear, the post extending at least partially between the coupling member and the forward gear in the same direction as the longitudinal axis of the shaft;
      at least one reverse gear drive post extending at least partially between the coupling member and the reverse gear, the post extending at least partially between the coupling member and the reverse gear in the same direction as the longitudinal axis of the shaft;
      a slot for receiving the forward gear drive post when the coupling member is in the first position, the slot encompassing a path concentric with rotation of the shaft; and
      a slot for receiving the reverse gear drive post when the coupling member is in the second position, the slot encompassing a path concentric with rotation of the shaft;
   wherein:
      movement of the coupling member in the direction of the longitudinal axis of the shaft to the first position creates relative movement between the forward gear drive post and the slot for receiving the forward gear drive post, the relative movement comprising the slot for receiving the forward gear drive post receiving the forward gear drive post;
      in the first position, contact between the forward gear drive post and an interruption in the slot for receiving the forward gear drive post causes torque to be transmitted between the forward gear and the coupling member;
      movement of the coupling member in the direction of the longitudinal axis of the shaft to the second position creates relative movement between the reverse gear drive post and the slot for receiving the reverse gear drive post, the relative movement comprising the slot for receiving the reverse gear drive post receiving the reverse gear drive post; and
      in the second position, contact between the reverse gear drive post and an interruption in the slot for receiving the reverse gear drive post causes torque to be transmitted between the reverse gear and the coupling member;
   a radio control receiver, the receiver being adapted to electronically output a shift signal;
   a sensor adapted to electronically provide a rotational speed signal corresponding to an actual rotational speed of at least a portion of a transmission for the vehicle; and
   a microcontroller electrically coupled to the receiver, the microcontroller being adapted to control a forward/reverse shift of the model vehicle transmission shifting assembly based at least on the electronic shift signal and the electronic rotational speed signal.

4. The model vehicle transmission shifting assembly of claim 3, wherein:
- the at least one forward gear drive post is formed integrally with and extending from the coupling member toward the forward gear, the post extending from the coupling member in the same direction as the longitudinal axis of the shaft;
- the at least one reverse gear drive post is formed integrally with and extending from the coupling member toward the reverse gear, the post extending from the coupling member in the same direction as the longitudinal axis of the shaft;
- the slot for receiving the forward gear drive post when the coupling member is in the first position is formed in the forward gear; and
- the slot for receiving the reverse gear drive post when the coupling member is in the second position is formed in the reverse gear.

5. The model vehicle transmission of claim 3, further comprising an actuator responsive to a receiver for sliding the coupling member along the shaft, from the first position to the second position, to change the rotation of the shaft from forward to reverse directions.

6. The model vehicle transmission of claim 3, further comprising:
- a plurality of forward gear drive posts extending at least partially between the coupling member and the forward gear, the posts being elongated in the direction of rotation of the surface of the coupling member and the shaft;
- a plurality of reverse gear drive posts extending at least partially between the coupling member and the reverse gear, the posts being elongated in the direction of rotation of the surface of the coupling member and the shaft;
- a plurality of slots for receiving the forward gear drive posts, each slot for receiving one of the forward gear drive posts when the coupling member is in the first position, the slots each encompassing a path equidistant from the shaft and each having a length greater than the dimension of the reverse gear drive post in the elongated direction; and
- a plurality of slots for receiving the reverse gear drive posts, each slot for receiving one of the reverse gear drive posts when the coupling member is in the second position, the slots each encompassing a path equidistant from the shaft and each having a length greater than the dimension of the reverse gear drive posts in the elongated direction.

7. The model vehicle transmission of claim 6, wherein the plurality of slots for receiving the forward gear drive posts are separated by a distance no greater than the dimension of the forward gear drive posts in the elongated direction of the posts, and wherein the plurality of slots for receiving the reverse gear drive posts are separated by a distance no greater than the dimension of the reverse gear drive posts in the elongated direction of the posts.

8. The model vehicle transmission of claim 3, wherein the coupling member is mounted for sliding movement along the shaft, between the first and second positions.

9. The model vehicle transmission of claim 3, wherein the coupling member moves with the shaft between the first and second positions.

10. The model vehicle transmission of claim 3, wherein the reverse gear drive post does not engage the reverse gear, when the coupling member is in the first position.

11. The model vehicle transmission of claim 3, wherein the forward gear drive post does not engage the forward gear, when the coupling member is in the second position.

12. The electronic shift lockout system of claim 3, wherein the microcontroller comprises a logic program, the logic program instructing the microcontroller to perform instructions comprising:
- moving the coupling member in the direction of the longitudinal axis of the shaft to the first position engaging the forward gear, wherein the forward gear drive post engages the slot for receiving the forward gear drive post.

13. The electronic shift lockout system of claim 3, wherein the microcontroller comprises a logic program, the logic program instructing the microcontroller to perform instructions comprising:
- moving the coupling member in the direction of the longitudinal axis of the shaft to the second position engaging the reverse gear, wherein the reverse gear drive post engages the slot for receiving the reverse gear drive post.

14. A method of shifting a transmission of a powered scale model vehicle, the method comprising:
- receiving an electronic request of a vehicle operator for a forward/reverse shift;
- determining whether a vehicle speed measurement from an electronic sensor is less than a threshold speed value;
- if the vehicle speed measurement is not less than the threshold speed value, preventing the forward/reverse shift from being initiated, and repeating the determining whether the vehicle speed measurement is less than the threshold speed value;
- if the vehicle speed measurement is less than the threshold speed value:
  - moving a coupling member mounted on a shaft in the direction of the longitudinal axis of the shaft to a position, the coupling member mounted on the shaft for rotation with the shaft and for movement in the direction of the longitudinal axis of the shaft to the position;
  - the moving the coupling member in the direction of the longitudinal axis of the shaft creating relative movement between a gear drive post and a slot, the relative movement comprising the slot receiving the gear drive post, the slot for receiving the gear drive post when the coupling member is in the position the gear drive post extending at least partially between the coupling member and a gear in-the same direction as the longitudinal axis of the shaft, the slot encompassing a path-concentric with rotation of the shaft; and
  - contact between the gear drive post and an interruption in the slot transmitting torque between the gear and the coupling member.

15. The method of claim 14, wherein the gear is a forward gear on the transmission of the powered scale model vehicle.

16. The method of claim 14, wherein the gear is a reverse gear on the transmission of the powered scale model vehicle.

* * * * *